United States Patent
Liu et al.

(10) Patent No.: US 10,408,855 B1
(45) Date of Patent: Sep. 10, 2019

(54) METHOD AND APPARATUS FOR EFFICIENTLY DETERMINING POSITIONAL STATES OF A VEHICLE IN A VEHICLE NAVIGATION SYSTEM

(71) Applicant: Marvell International Ltd., Hamilton (BM)

(72) Inventors: BoChih Liu, Shanghai (CN); Zhike Jia, Fremont, CA (US); Jing Yu, Shanghai (CN); Hongquan Liu, Shanghai (CN); Jinfeng Liu, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 180 days.

(21) Appl. No.: 15/270,715

(22) Filed: Sep. 20, 2016

Related U.S. Application Data

(60) Provisional application No. 62/221,411, filed on Sep. 21, 2015.

(51) Int. Cl.
| | | |
|---|---|---|
| *G01R 13/00* | (2006.01) | |
| *G01P 15/18* | (2013.01) | |
| *G06F 17/18* | (2006.01) | |
| *G01P 13/00* | (2006.01) | |
| *G06N 7/00* | (2006.01) | |

(52) U.S. Cl.
CPC ............ *G01P 13/00* (2013.01); *G01P 15/18* (2013.01); *G06F 17/18* (2013.01); *G06N 7/005* (2013.01)

(58) Field of Classification Search
CPC .......... G01P 13/00; G01P 15/18; G06F 17/18; G06N 7/005
See application file for complete search history.

(56) References Cited

U.S. PATENT DOCUMENTS

| | | | | |
|---|---|---|---|---|
| 5,862,511 A | * | 1/1999 | Croyle | G01C 21/28 701/445 |
| 2007/0156315 A1 | * | 7/2007 | Raab | B60T 8/17551 701/38 |
| 2011/0172918 A1 | * | 7/2011 | Tome | G01C 21/165 701/500 |

FOREIGN PATENT DOCUMENTS

EP 2182372 A1 * 5/2010 ............. G01P 13/04

* cited by examiner

*Primary Examiner* — Manuel L Barbee

(57) ABSTRACT

Aspects of the disclosure provide a system for detecting a movement that includes a moving state detector, a profile-based movement state detector, and a refined movement state detector. The moving state detector is configured to generate a moving state based on a detected speed. The profile-based movement state detector is configured to determine an estimated movement state based on the moving state and detected accelerations. The refined movement state detector is configured to generate, in response to the estimated movement state corresponding to a predetermined triggering movement state, a refined movement state based on a detected angular velocity.

19 Claims, 8 Drawing Sheets

VEHICLE MOVEMENT STATES

METHOD AND APPARATUS FOR EFFICIENTLY DETERMINING POSITIONAL STATES OF A VEHICLE IN A VEHICLE NAVIGATION SYSTEM

INCORPORATION BY REFERENCE

This present disclosure claims the benefit of U.S. Provisional Application No. 62/221,411, "Vehicle State Detection Based on Tri-Axial Accelerometer" filed on Sep. 21, 2015, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In many applications, a device that is held by a user or installed on a vehicle provides various services based on information such as a position, heading, speed, and/or movement of the device. A movement state of the device can indicate a corresponding movement of the user or the vehicle. In many applications, the movement state of the device may be determined based on an angular velocity obtained by a gyroscope associated with the device. However, determining the movement state of the device based on the gyroscope usually takes a large amount of calculations, and thus becomes a resource and power demanding task for the device.

SUMMARY

Aspects of the disclosure provide a system for detecting a movement state that includes a moving state detector, a profile-based movement state detector, and a refined movement state detector. The moving state detector is configured to generate a moving state based on a detected speed. The profile-based movement state detector is configured to determine an estimated movement state based on the moving state and detected accelerations. The refined movement state detector is configured to generate, in response to the estimated movement state corresponding to a predetermined triggering movement state, a refined movement state based on a detected angular velocity.

In an embodiment, the profile-based movement state detector is configured to determine interim movement states based on the detected accelerations and to identify a latest one of the interim movement states as the estimated movement state when a second detected speed that is greater than a predetermined threshold is received.

In an embodiment, the profile-based movement state detector is configured to convert the detected accelerations into a sequence of observation tokens, to calculate probabilities of candidate movement states based on the sequence of observation tokens, and to identify one of the candidate movement states that corresponds to a highest probability as the latest one of the interim movement states.

In an embodiment, the profile-based movement state detector is further configured to perform a low-pass filtering process on the detected accelerations prior to converting the detected accelerations into the sequence of observation tokens. The candidate movement states may include a moving straight state, a turning left state, and a turning right state In an embodiment, the profile-based movement state detector van be further configured to determine a posture of an acceleration detector when a second detected speed that is equal to or less than a predetermined threshold is received, determine a reference axis based on the detected posture of the acceleration detector, and determine the estimated movement state based on components of the detected accelerations corresponding to the reference axis.

Aspects of the disclosure provide a method for determining movement state. The method includes receiving detected accelerations at a first update rate and determining interim movement states in response to the received detected accelerations. The movement state detection method also includes receiving detected speeds at a second update rate that is slower than the first update rate, and identifying a latest one of the interim movement states as an estimated movement state when a first detected speed of the detected speeds that is greater than a predetermined threshold is received.

In an embodiment, the method further includes receiving a detected angular velocity, and, in response to the estimated movement state corresponding to a predetermined triggering movement state, determining a refined movement state based on the detected angular velocity.

Determining the latest one of the interim movement states can include converting the detected accelerations into a sequence of observation tokens, calculating probabilities of various candidate movement states based on the sequence of observation tokens and a previous interim movement state using a Hidden Markov Model, and identifying a movement state among the candidate movement states that corresponds to a highest probability as the latest one of the interim movement states.

Aspects of the disclosure provide a circuit for detecting a movement state that includes a moving state detector and a profile-based movement state detector configured. The moving state detector is configured to set a moving state to a non-stationary state when a first detected speed greater than a predetermined threshold is received, and set the moving state to a stationary state when the first detected speed that is equal to or less than the predetermined threshold is received. The profile-based movement state detector is configured to determine interim movement states when the moving state is at the non-stationary state by calculating probabilities of various candidate movement states based on a plurality of detected accelerations.

In an embodiment, the profile-based movement state detector is further configured to identify a latest one of the interim movement states as an estimated movement state when a second detected speed greater than the predetermined threshold is received. In an embodiment, the movement state detection circuit further includes a refined movement state detector configured to determine a refined movement state based on a detected angular velocity when the estimated movement state qualifies as a predetermined triggering movement state.

The profile-based movement state detector can include a filter and a Hidden Markov Model analyzer. The filter is configured to convert the plurality of detected accelerations into a sequence of observation tokens. The Hidden Markov Model analyzer is configured to, during an iteration, calculate the probabilities of the candidate movement states based on the sequence of observation tokens and a previous interim movement state from a previous iteration using a Hidden Markov Model, and identify a movement state among the candidate movement states that corresponds to a highest probability as an interim movement state of the iteration.

In an embodiment, the Hidden Markov analyzer includes a storage configured to store transition and emission matrices of the Hidden Markov Model, a likelihood calculator configured to calculate the probabilities of the candidate movement states using the transition and emission matrices of the Hidden Markov Model, and a state selector configured to identify the movement state among the candidate movement states that corresponds to the highest probability.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Embodiments of this disclosure provide a movement state detection technique where a movement state of a device is initially estimated by performing a profile-based analysis based on detected accelerations. By doing so, the technique reduces power consumption of the device because such a profile-based analysis is less resource and power demanding than calculating the movement state based on detected angular velocities from a gyroscope. In some examples, the movement state of the device estimated by performing the profile-based analysis (i.e., the "estimated movement state") may be sufficiently accurate for various services provided by the device. However, in some examples, a more accurate determination of the movement state of the device (i.e., a "refined movement state") may be needed when the estimated movement state triggers some further action by falling within a set of predetermined movement states (i.e., the "triggering movement states"). When the estimated movement state qualifies as a triggering movement state and thus indicates that a more accurate movement state is needed, additional resources and power can be used so that the refined movement state may then calculated based on the detected angular velocities. Accordingly, the movement of the device or vehicle can be monitored with sufficient accuracy while the overall resource and power consumption can be reduced.

Figure 1:
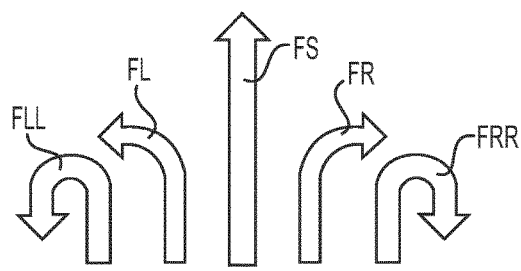
FIG. 1 shows a diagram of a vehicle and various example types of movements.
Figure 1:
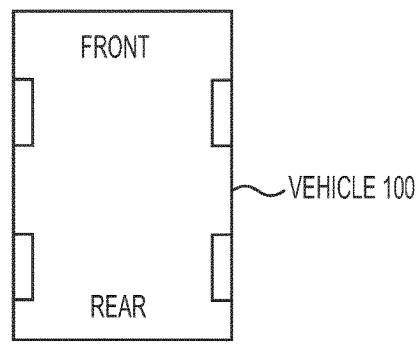
Figure 1:
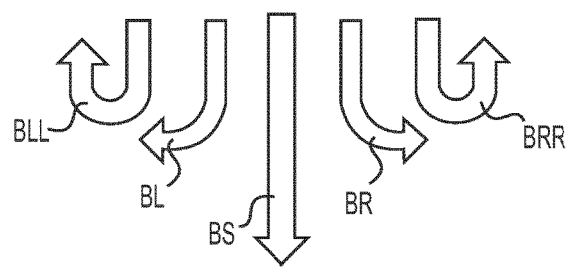

FIG. 1 shows a diagram of a vehicle 100 and various types of movements that vehicle 100 may make which are shown as movement states. A movement state of the device can be associated with a movement of a user holding the device or can indicate a movement of a vehicle 100 in which the device is contained or installed. As shown in FIG. 1 for example, when the vehicle 100 is moving forward, a movement state of the vehicle 100 can be classified as moving straight (FS) or making a right turn (FR), a left turn (FL), a sharp right turn (FRR), or a sharp left turn (FLL). Similarly, when the vehicle 100 is moving backwards, the movement state of the vehicle 100 may be classified as moving straight (BS) or making a right turn (BR), a left turn (BL), a sharp right turn (BRR), or a sharp left turn (BLL).

Figure 2:
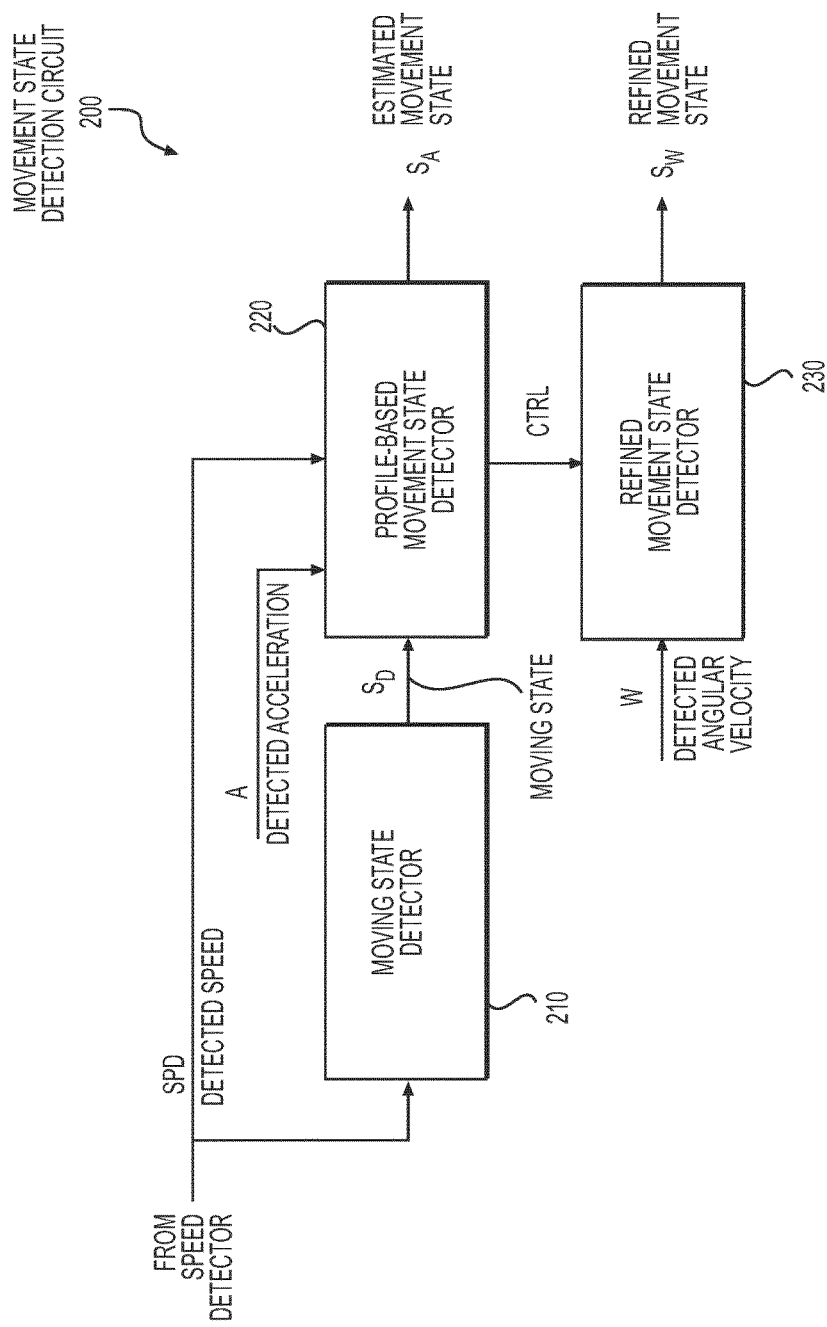
FIG. 2 shows a functional block diagram of an example movement state detection circuit according to an embodiment of the disclosure.

The movement state of a device can be determined by a movement state detection circuit. FIG. 2 shows a functional block diagram of an example movement state detection circuit 200 according to an embodiment of the disclosure. The movement state detection circuit 200 determines an estimated movement state $S_A$ and/or a refined movement state $S_W$ of a device to which the movement state detection circuit 200 is associated. The estimated movement state $S_A$ of a device is an approximation of the movement state of the device based on a profile-based analysis. The refined movement state $S_W$ of a device is a calculated result of a movement state of the device. While the estimated movement state $S_A$ can be less accurate than the refined movement state $S_W$, the process for determining the estimated movement state $S_A$ is less resource and power intensive relative to that for determining the refined movement state $S_W$.

As shown in FIG. 2, the movement state detection circuit 200 includes a moving state detector 210, a profile-based movement state detector 220, and a refined movement state detector 230. In some examples, the estimated movement state $S_A$ is selected from a plurality of candidate movement states, such as those movement states shown in FIG. 1.

The moving state detector 210 can be any device that makes an initial determination as to whether the device is moving. The moving state detector 210 receives a detected speed (SPD) signal from a speed detector, and generates, based on the SPD signal, a moving states $S_D$ signal that indicates whether the device is moving. In some examples, the operations of the profile-based movement state detector 220 and/or the refined movement state detector 230 depend on the detected moving states $S_D$.

The profile-based movement state detector 220 receives the moving states $S_D$ signal from the moving state detector 210, the SPD signal from the speed detector, as well as a detected acceleration signal A from an accelerometer (not shown). Based on these inputs, the profile-based movement state detector 220 determines an estimated movement state $S_A$.

The profile-based movement state detector 220 may instruct the refined movement state detector 230, via a control signal CTRL, to determine a refined movement state $S_W$ when the estimated movement state $S_A$ falls within a set of predetermined triggering movement states. For example, when the estimated movement state $S_A$ corresponds to making a right turn, making a left turn, making a sharp right turn, or making a sharp left turn, the profile-based movement state detector 220 causes the refined movement state detector 230 to determine a refined movement state $S_W$.

The refined movement state detector 230 is configured to receive a detected angular velocity W from an angular velocity detector (not shown), such as a gyroscope, and to determine the refined movement state $S_W$ based on the detected angular velocity W. In some examples, the angular velocity detector is part of the device where the movement state detection circuit 200 resides, or is disposed on a user or a vehicle separately. The refined movement state detector 230 can be further configured to receive the control signal CTRL from the profile-based movement state detector 220 and to determine the refined movement state $S_W$ in response to the control signal CTRL.

The profile-based movement state detector 220 generates an estimated movement state $S_A$ of the device. The profile-based movement state detector 220 determines an interim movement state when the profile-based movement state detector 220 receives an updated detected acceleration A. In some examples, the profile-based movement state detector 220 determines a latest interim movement state as an estimated movement state $S_A$ in response to a detected speed SPD that is greater than a second predetermined threshold, which indicates that the device is still moving. The second predetermined threshold may range from 5 km/h to 10 km/h. In some examples, the first predetermined threshold and the second predetermined threshold are set to be the same.

The accelerometer can be part of the device where the movement state detection circuit 200 resides or can be disposed on a user or a vehicle separately. In some examples, the accelerometer outputs the detected accelerations A of the device or the vehicle at an update rate $f_A$ ranging from 20 updates to 50 updates per second, which is faster than the update rate $f_{SPD}$. In some examples, the profile-based movement state detector 220 determines interim movement states when the moving state $S_D$ is at the non-stationary state.

The profile-based movement state detector 220 determines an interim movement state in response to each detected acceleration A. Accordingly, the profile-based movement state detector 220 determines the interim movement states by iterations of calculations repeated at the update rate $f_A$. In some examples, the profile-based movement state detector 220 determines, for every iteration in response to the updated detected acceleration, an interim movement state of the iteration based on the corresponding detected acceleration, a predetermined number of prior detected accelerations, and a previous interim movement state from a previous iteration. The profile-based movement state detector 220 also receives a detected heading of the device or vehicle accompanied with or embedded in a corresponding detected speed SPD from the speed detector. In such examples, the profile-based movement state detector 220 also outputs the estimated movement state $S_A$ with the detected heading. An interim movement state or an estimated movement state $S_A$ may be one of the following states illustrated with reference to FIG. 1: moving straight (e.g., moving straight FS or BS), making a right turn (e.g., making a right turn FR or BR), making a left turn (e.g., making a left turn FL or BL), making a sharp right turn (e.g., making a sharp right turn FRR or BRR), and making a sharp left turn (e.g., making a sharp left turn FLL or BLL).

In some examples, the speed detector outputs detected speeds SPD of the device, or the vehicle in which the device is installed, at an update rate $f_{SPD}$ ranging from one update every 0.5 seconds to one update every 2 seconds. The moving state detector 210 sets a moving state $S_D$ at a non-stationary state when a detected speed SPD is greater than a first predetermined threshold, and sets the moving state $S_D$ to a stationary state when the detected speed SPD is equal to or less than the first predetermined threshold, such as from 5 to 10 km/h.

The speed detector includes at least one of a satellite-based positioning circuit, a ground-based positioning circuit, a graphic-based speed detector, a wheel speed sensor, and a fluid flow velocity sensor. In some examples, the speed detector is part of the device where the movement state detection circuit 200 resides, or is disposed on a user or a vehicle separately.

In operation, the movement state detection circuit 200 can initially determine a moving state $S_D$ in order to determine whether to update a movement state of the device, either using the estimated movement state $S_A$ or the refined movement state $S_W$. In some examples, when the moving state $S_D$ indicates that the device is moving, such as moving at a speed greater than a predetermined speed threshold, the movement state detection circuit 200 causes the profile-based movement state detector 220 to determine the estimated movement state $S_A$ of the device based on the detected acceleration A. However, when an estimated movement state $S_A$ falls within a set of predetermined triggering movement states, the profile-based movement state detector 220 instructs the refined movement state detector 230 to determine a refined movement state $S_W$. For example, when the estimated movement state $S_A$ corresponds to a predetermined triggering movement state such as making a right turn, making a left turn, making a sharp right turn, or making a sharp left turn, the profile-based movement state detector 220 can cause the refined movement state detector 230 to determine the refined movement state $S_W$. The movement state detection circuit 200 may output one or both of the estimated movement state $S_A$ and the refined movement state $S_W$ to other components of the device, such that the services provided by the device may be performed based on the detected movement state $S_A$ or $S_W$.

The power and computational resources for determining a refined movement state $S_W$, including the resources for operating the angular velocity detector and the refined movement state detector 230, are greater than the power and computational resources for determining an estimated movement state $S_A$, including the resources for operating the speed detector, the accelerometer, the moving state detector 210, and the profile-based movement state detector 220. However, the refined movement state $S_W$ is more accurate than the estimated movement state $S_A$ in monitoring the movement of the device. Therefore, by using the refined movement state detector 230 in response to the presence of a predetermined triggering movement state, the movement of the device or vehicle is monitored with sufficient accuracy while the overall resource consumption according to the present disclosure is less than that of the configuration that uses the refined movement state detector 230 all the time.

Figure 3:
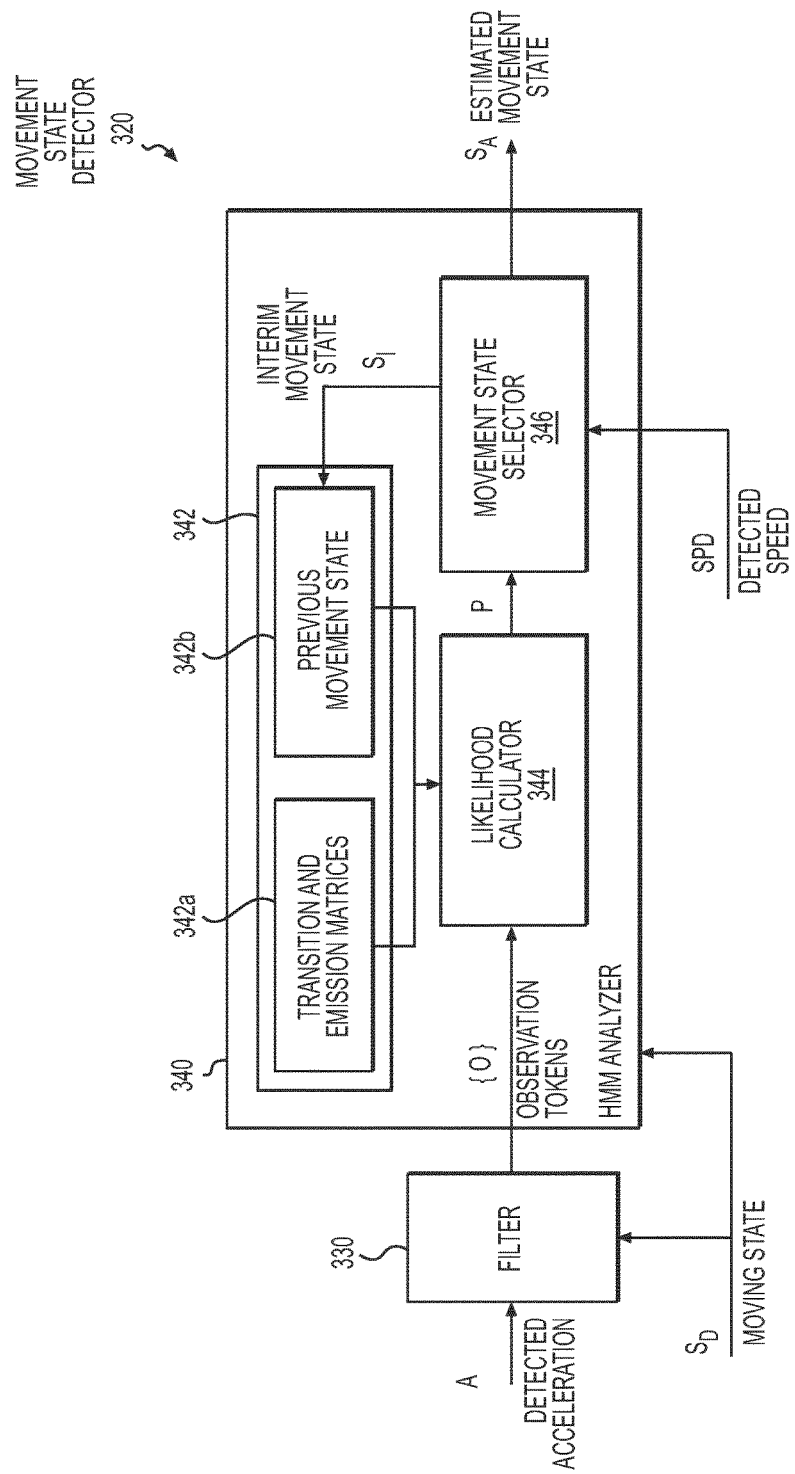
FIG. 3 shows a functional block diagram of an example profile-based movement state detector of a movement state detection circuit according to an embodiment of the disclosure.

FIG. 3 shows a functional block diagram of an example profile-based movement state detector 320 of a movement state detection circuit. The profile-based movement state detector 320 is implemented based on using a Hidden Markov Model (HMM) and is illustrated as a non-limiting example. It should be understood that various other types of profile-based movement state detectors 320 may also be applicable.

As shown, the profile-based movement state detector 320 includes a filter 330 and a Hidden Markov Model (HAW) analyzer 340. The profile-based movement state detector

320 may receive the detected acceleration A and moving state $S_D$, and generate interim movement states $S_I$ accordingly. The profile-based movement state detector 320 may also receive the detected speed SPD and, in response to the received detected speed SPD, select the latest one of the interim movement states as an estimated movement state $S_A$ for output.

The filter 330 receives the detected accelerations A. In some examples, the filter 330 extracts the components of the detected accelerations A corresponding to a predetermined reference axis that is most responsive to the turning of the device or the vehicle. For example, when the accelerometer that outputs the detected accelerations A is a multi-axis accelerometer, the reference axis is one of the axes of detection of the accelerometer. In another example, when the accelerometer that outputs the detected accelerations A is a multi-axis accelerometer, the reference axis is a virtual axis, where the components of the reference axis is determined by calculating all detected accretions from all axes of detection of the accelerometer based on a conversion matrix. In some examples, the reference axis is determined based on a posture of the device where the profile-based movement state detector 320 resides. The posture of the device is determined based on the detected accelerations when the device is at the stationary state, in which case the detected accelerations are caused mainly by the gravity of the Earth.

The filter 330 receives the components of the detected accelerations A corresponding to the reference axis from the accelerometer. For example, when the accelerometer that outputs the detected accelerations A is a single-axis accelerometer, the reference axis is the axis of detection of the accelerometer. In other example, when the accelerometer that outputs the detected accelerations A is a multi-axis accelerometer, the accelerometer processes the detected accelerations and outputs the components of the detected accelerations A corresponding to the reference axis.

Figure 4A:
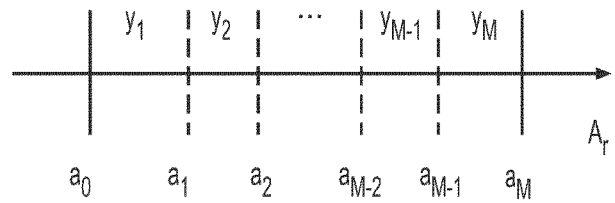
FIG. 4A shows a diagram of example mapping of components of detected accelerations corresponding to a reference axis versus corresponding observation tokens according to an embodiment of the disclosure.

The filter 330 also converts a detected acceleration and a predetermined number of prior detected accelerations into a sequence of observation tokens $\{O\}$. For example, FIG. 4A shows a diagram of example mapping of components of detected accelerations corresponding to a reference axis versus corresponding observation tokens according to an embodiment of the disclosure. The example depicted in FIG. 4A is a non-limiting example for illustrative purposes only. In FIG. 4A, the detected accretion $A_r$ ranges from $a_0$ to $a_M$, within which is divided into M sections and M is a positive integer. In FIG. 4A, when a detected acceleration falls within a region $a_{m-1} \sim a_m$ (for example, $a_{m-1} \leq$ detected acceleration $< a_m$, m ranges from 1 to M), a corresponding observation token $y_m$ (one of the observation token $y_1$ to $y_M$) is assigned to the detected acceleration.

In some examples, the filter 330 further performs a low-pass filtering process on the sequence of detected accelerations A, including the detected acceleration and the N prior detected accelerations, prior to converting the detected acceleration and the N prior detected accelerations into the sequence of observation tokens $\{O\}$. Therefore, a mid-term or long-term trend of the sequence of detected accelerations A is reflected in the generated sequence of observation tokens $\{O\}$, and instantaneous fluctuations or noises of the detected accelerations A are thus ignored.

The HMM analyzer 340 receives the moving state $S_D$ and may be activated when the moving state $S_D$ is set to the non-stationary state. The HMM analyzer 340 also receives the sequence of observation tokens $\{O\}$ and the detected speeds SPD and determines an estimated movement state $S_A$ in response to an updated detected speed SPD when the updated speed is greater than a predetermined threshold. The predetermined threshold corresponds to the aforementioned second predetermined threshold. The HMM analyzer 340 includes a storage 342, a likelihood calculator 344, and a movement state selector 346.

The storage 342 stores transition matrices and emission matrices 342a of a Hidden Markov Model, as well as a previously determined interim movement state 342b.

The likelihood calculator 344 calculates the probabilities of the plural candidate movement states. These can include the movement states illustrated in FIG. 1, being an interim movement state based on the sequence of observation tokens $\{O\}$ and the previous interim movement state 342b using the transition and emission matrices 342a of the Hidden Markov Model.

The movement state selector 346 identifies a movement state among the plural candidate movement states that corresponds to a highest probability as the interim movement state $S_I$ and outputs the interim movement state $S_I$ to the storage 342. In some examples, an updated interim movement state $S_I$ is determined every time an updated acceleration A is received.

In addition, upon receipt of an updated detected speed SPD, the movement state selector 346 identifies a latest one of the interim movement states $S_I$ as an estimated movement state $S_A$ when the updated detected speed SPD is greater than the predetermined threshold, such as the aforementioned second predetermined threshold.

Figure 4B:
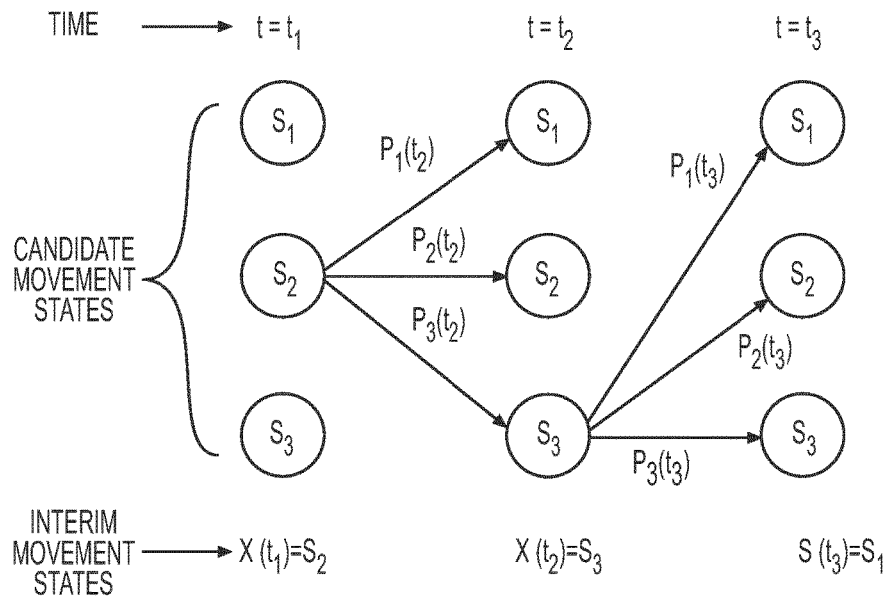
FIG. 4B shows a trellis diagram of determining interim movement states by an example profile-based movement state detector according to an embodiment of the disclosure.

For example, FIG. 4B shows a trellis diagram of determining interim movement states $S_I$ by an example profile-based movement state detector, such as the profile-based movement state detector 320, according to an embodiment of the disclosure. The example depicted in FIG. 4B is a non-limiting example for illustrative purposes only. In FIG. 4B, an interim movement state $S_I$ at a given time $t_1$, $t_2$, or $t_3$ is expressed as $x(t_1)$, $x(t_2)$, or $x(t_3)$, respectively. Each one of the interim movement state $x(t_1)$, $x(t_2)$, or $x(t_3)$ corresponds to one of a set of candidate movement state $S_1$, $S_2$, or $S_3$. For example, regardless the device or the vehicle is moving forward or backward, movement state $S_1$ corresponds to making a right turn, movement state $S_2$ corresponds to moving straight, and movement state $S_3$ corresponds to making a left turn.

In operation, the profile-based movement state detector 320 converts, by the filter 330, a detected acceleration and a predetermined number of prior detected accelerations into a sequence of observation tokens $\{O\}$, such as $\{O(t_1), O(t_2), \ldots, O(t_N), O(t_{N+1})\}$, where N is a positive integer, $O(t_{N+1})$ is an observation token corresponding to the detected acceleration, $O(t_1)$, $O(t_2)$, and $O(t_N)$ are observation tokens corresponding to previous N detected accelerations. Each one of the observation tokens $O(t_1)$, $O(t_2)$, $O(t_N)$, and $O(t_{N+1})$ is selected from one of a predetermined set of observation tokens, such as the observation tokens $y_1$ to $y_m$ in FIG. 4A.

In operation, the profile-based movement state detector 320 also determines, by the HMM analyzer 340, interim movement states. For example, as shown in FIG. 4B, at time $t_1$, the interim movement state is $S_2$ (i.e., $x(t_1) = S_2$). The interim movement state corresponding to time $t_1 \times (t_1)$ is recorded in the storage 342 as the previous movement state 342b for determining the next interim movement state.

At time $t_2$, the likelihood calculator 344 calculates, using a Viterbi algorithm, the probabilities of the candidate movement states being the interim movement state of time $t_2$ based on the transition matrices and emission matrices 342a of a Hidden Markov Model and a previously determined interim movement state 342b (e.g., $x(t_1) = S_2$). For example, the probability of the movement state $S_1$ being the interim movement state of time $t_2$ is $P_1(t_2)$, the probability of the movement state $S_2$ being the interim movement state of time $t_2$ is $P_2(t_2)$, and the probability of the movement state $S_3$ being the interim movement state of time $t_2$ is $P_3(t_2)$. If, for example, $P_3(t_2)$ has the highest value, the movement state selector 346 determines that the interim movement state of time $t_2$ is $S_3$ (i.e., $x(t_2)=S_3$). The interim movement state $x(t_2)$ is recorded in the storage 342 as the previous movement state 342b for determining the next interim movement state.

At time $t_3$, the likelihood calculator 344 calculates, using a Viterbi algorithm, the probabilities of the candidate movement states being the interim movement state of time $t_3$ based on the transition matrices and emission matrices 342a of the Hidden Markov Model and a previously determined interim movement state 342b. For example, the probability of the movement state $S_1$ being the interim movement state of time $t_3$ is $P_1(t_3)$, the probability of the movement state $S_2$ being the interim movement state of time $t_3$ is $P_2(t_3)$, and the probability of the movement state $S_3$ being the interim movement state of time $t_3$ is $P_3(t_3)$. If for example $P_1(t_3)$ has the highest value, the movement state selector 346 determines that the interim movement state of time $t_3$ is $S_1$ (i.e., $x(t_3)=S_1$). The interim movement state $x(t_3)$ is recorded in the storage 342 as the previous movement state 342b for determining the next interim movement state.

Also, in operation, if at time $t_3$ the movement state selector 346 receives an updated detected speed SPD that is greater than a threshold value, the movement state selector 346 also identifies that the latest one of the interim movement states (i.e., $x(t_3)=S_1$) as the estimated movement state $S_A$.

The filter 330 and the HMM analyzer 340 also receive a moving state $S_D$, and the operations of the filter 330 and/or the HMM analyzer 340 are activated when the moving state $S_D$ is at the moving state. In some examples, the operations of the filter 330 and/or the HAW analyzer 340 are suspended when the moving state $S_D$ is at the stationary state.

In some examples, the transition matrices and emission matrices 342a and/or other parameters of the Hidden Markov Model are analyzed by conducting field experiments and/or computer simulations prior to delivering the profile-based movement state detector 320 to an end user. Also, Hidden Markov Model is illustrated as a non-limiting example for implementing the profile-based movement state detector 320. In some examples, profile-based movement state detector 320 is implemented based on other suitable algorithm or circuit configurations.

Of course, the number of candidate movement states and the observation tokens in FIGS. 4A and 4B are illustrated as non-limiting examples. Various modifications and variations and different numbers of candidate movement states and the observation tokens are within the contemplated embodiments.

Figure 5:
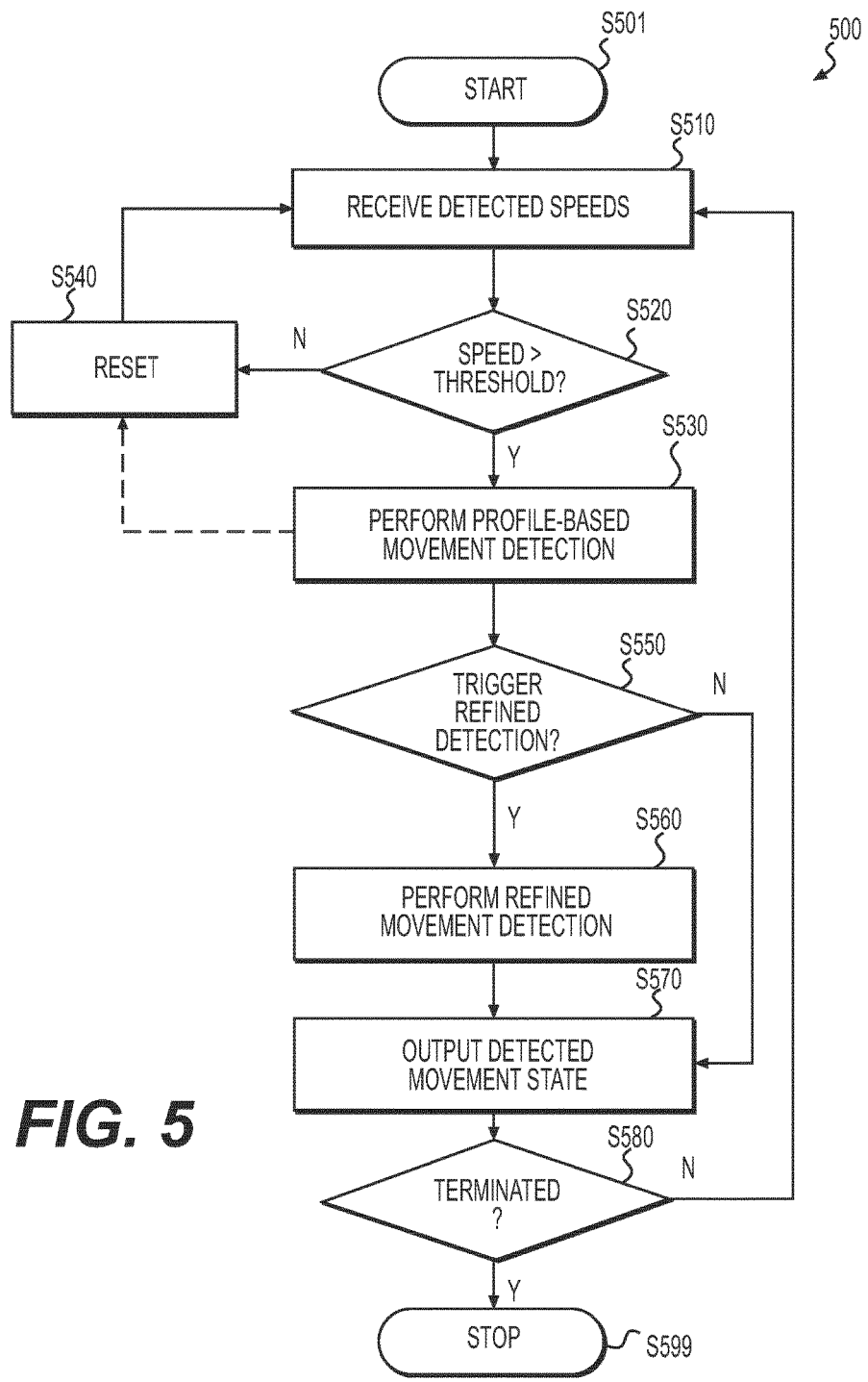
FIG. 5 shows a flow chart outlining an example process of detecting a movement state of a device according to an embodiment of the disclosure.

FIG. 5 shows a flow chart outlining an example process 500 of detecting a movement state of a device according to an embodiment of the disclosure. In some examples, the process 500 is performed by at least the movement state detection circuit 200 in FIG. 2. It is understood that additional operations may be performed before, during, and/or after the process 500 depicted in FIG. 5. The process 500 starts at S501 and proceeds to S510.

At S510, a detected speed is received. In some example, detected speeds are provided by a speed detector at a predetermined update rate. In some example, the process 500 revisits S510 multiple times under various conditions illustrated below to receive the detected speeds. For example, the movement state detection circuit 200 receives detected speeds SPD of a device or a vehicle from a speed detector at an update rate $f_{SPD}$. In some examples, the update rate $f_{SPD}$ ranges from one update every 0.5 seconds to one update every 2 seconds.

At S520, it is determined whether the detected speed received at S510 is greater than a first predetermined threshold. For example, the moving state detector 210 determines that a moving state $S_D$ of the device is at a non-stationary state when the detected speed SPD is greater than the first predetermined threshold, and the moving state detector 210 determines that the moving state $S_D$ of the device is at a stationary state when the detected speed SPD is equal to or less than the first predetermined threshold. In some examples, the first predetermined threshold may range from 5 km/h to 10 km/h. At S520, when the detected speed is greater than the first predetermined threshold, the process proceeds to S530; otherwise, the process proceeds to S540.

At S530, a profile-based movement state detection process is performed in order to determine an estimated movement state. In some examples, the profile-based movement state detection process is performed by a profile-based movement state detector, such as the profile-based movement state detector 220 in FIG. 2 or the profile-based movement state detector 320 in FIG. 3. In some examples, the estimated movement state may be one of a set of candidate movement states, such as moving straight, making a right turn, making a left turn, making a sharp right turn, or making a sharp left turn. Detailed operations of profile-based movement state detection process will be illustrated with reference to FIG. 6.

At S530, in some examples, if no movement state is determined at S530 because an updated detected speed is less than a second predetermined threshold, the process proceeds to S540. In some examples, the second predetermined threshold may range from 5 km/h to 10 km/h. If an updated estimated movement state is determined at S530, the process proceeds to S550.

At S540, various settings for determining the movement state of the device are reset. In some examples, S540 includes receiving detected accelerations output by an acceleration detector, detecting a posture of the acceleration detector based on detected accelerations, and determining a reference axis based on the detected posture of the acceleration detector. In some examples, S540 is performed by the moving state detector 210, the profile-based movement state detector 220, and/or other suitable components of the movement state detection circuit 200. After S540, the process proceeds to S510.

At S550, it is determined whether the estimated movement state falls within a set of predetermined triggering movement states. In some examples, the set of predetermined triggering movement states is a subset of the set of candidate movement states and indicates that determining a refined movement state based on a detected angular velocity is justified. In some examples, the set of predetermined triggering movement states includes making a right turn, making a left turn, making a sharp right turn, or making a sharp left turn. At S550, when the estimated movement state falls within the set of predetermined triggering movement states, the process proceeds to S560. Otherwise, when the estimated movement state does not fall within the set of predetermined triggering movement states, the process proceeds to S570.

At S560, when the estimated movement state falls within the set of predetermined triggering movement states, a refined movement state detection process is performed. In some examples, the refined movement state detection process is performed by a refined movement state detector, such as the refined movement state detector 230 in FIG. 2. In some examples, the refined movement state detection process includes receiving a detected angular velocity and determining the refined movement state based on the detected angular velocity.

At S570, the estimated movement state determined at S530, and/or the refined movement state determined at S560, if available, are outputted for further processing. For example, the movement state detection circuit 200 outputs the estimated movement state $S_A$ determined by the profile-based movement state detector 220 and/or the refined movement state $S_W$ determined by the refined movement state detector 230.

At S580, it is determined whether to terminate the process 500. If the process 500 is to be terminated, the process proceeds to S599 and terminates. If the process 500 is not yet to be terminated, the process proceeds to S510, and a next moving state, estimated movement state, and/or refined movement state are determined based on S510-S570 illustrated above.

Figure 6:
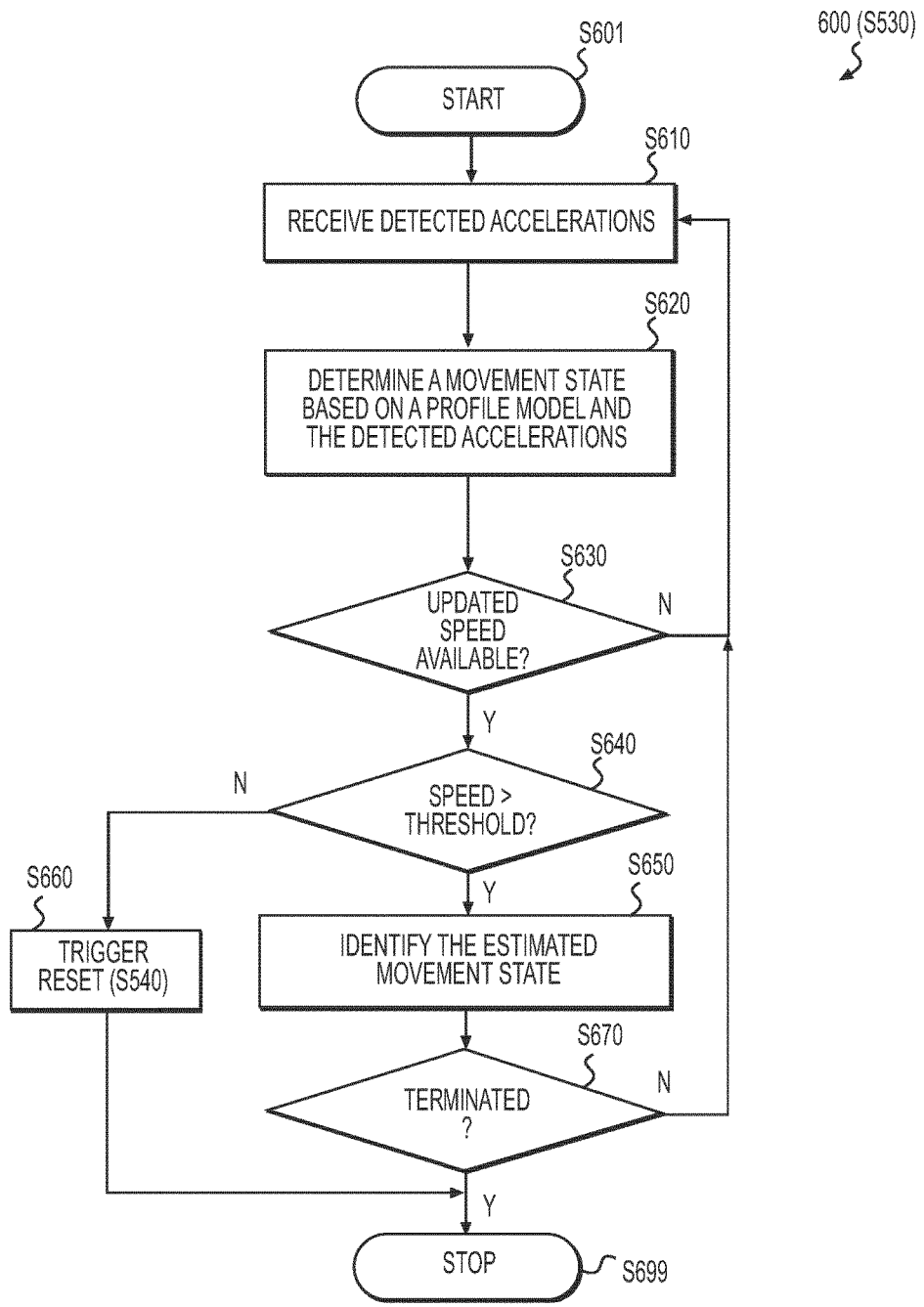
FIG. 6 shows a flow chart outlining an example process of detecting an estimated movement state of a device by a profile-based movement state detector according to an embodiment of the disclosure.

FIG. 6 shows a flow chart outlining an example process 600 of detecting an estimated movement state of a device by a profile-based movement state detector according to an embodiment of the disclosure. In some examples, the process 600 is performed by a profile-based movement state detector, such as the profile-based movement state detector 220 in FIG. 2 or the profile-based movement state detector 320 in FIG. 3. In some examples, the process 600 corresponds to S530 in FIG. 5. It is understood that additional operations may be performed before, during, and/or after the process 600 depicted in FIG. 6. The process 600 starts at S601 and proceeds to S610.

At S610, a detected acceleration is received. In some example, detected accelerations are provided by an acceleration detector at a predetermined update rate. In some example, the process 600 revisits S610 multiple times under various conditions illustrated below to receive the detected accelerations that are provided at the predetermined update rate. For example, the profile-based movement state detector 320 receives detected accelerations A of a device or a vehicle from an acceleration detector at an update rate $f_A$. In some examples, the update rate $f_A$ ranges from 20 updates to 50 updates per second.

At S620, interim movement states are determined in response to the received detected accelerations. In some examples, for a current iteration, in response to a detected acceleration received at S610, an interim movement state of the current iteration is determined based on the detected acceleration, a predetermined number of prior detected accelerations, and a previous interim movement state from a previous iteration. For example, the HMM analyzer 340 determines interim movement states $S_I$ in response to the received detected accelerations A. Detailed operations of determining interim movement states will be illustrated with reference to FIG. 7.

At S630, it is determined if an updated detected speed is available since the determination of last interim movement state. When an updated detected speed is available, the process proceeds to S640. When an updated detected speed is not available, the process proceeds to S610. For example, the movement state selector 346 determines whether an updated detected speed SPD is available. In some examples, S610-S630 are performed in response to each one of the detected accelerations provided at the update rate $f_A$, and the detected speeds are provided at the update rate $f_{SPD}$ that is slower than the update rate $f_A$. For example, if the update rate $f_A$ is K times faster than the update rate $f_{SPD}$, in at least one example, S610-S630 repeats K times before S630 determines that the process may proceed to S640. Therefore, one interim movement state is determined in response to a detected acceleration, and K interim movement states are determined within a duration between two detected speeds. In some examples, K is a positive integer ranging from 20 to 100.

At S640, it is determined whether the updated detected speed is greater than a second predetermined threshold. When the updated detected speed is greater than the second predetermined threshold, the device or the vehicle is likely to be at the non-stationary state, and the process proceeds to S650. When the updated detected speed is not greater than the second predetermined threshold, the device or the vehicle is likely to be at the stationary state, and the process proceeds to S660. In some examples, the second predetermined threshold may range from 5 km/h to 10 km/h.

At S650, when the updated detected speed is greater than the second predetermined threshold, a latest one of the interim movement states is used as an estimated movement state. For example, the state selector 346 identifies a latest interim movement state $S_I$ as an estimated movement state $S_A$ when the updated detected speed SPD that is greater than the second predetermined threshold is received.

At S660, because the device or the vehicle is likely to be at the stationary state, the device or the vehicle is not considered as corresponding to any of the candidate movement states. The process 600 triggers the performance of S540 and then proceeds to S699.

In some examples, an executed application program that receives the estimated movement state determines how the estimated movement state will be interpreted in light of the detected speeds, and S640 and S660 are omitted.

At S670, it is determined whether to terminate the process 600. If the process 600 is to be terminated, the process proceeds to S699 and terminates. If the process 600 is not yet to be terminated, the process proceeds to S610, and a next estimated movement state is determined based on S610-S650 as illustrated above.

Figure 7:
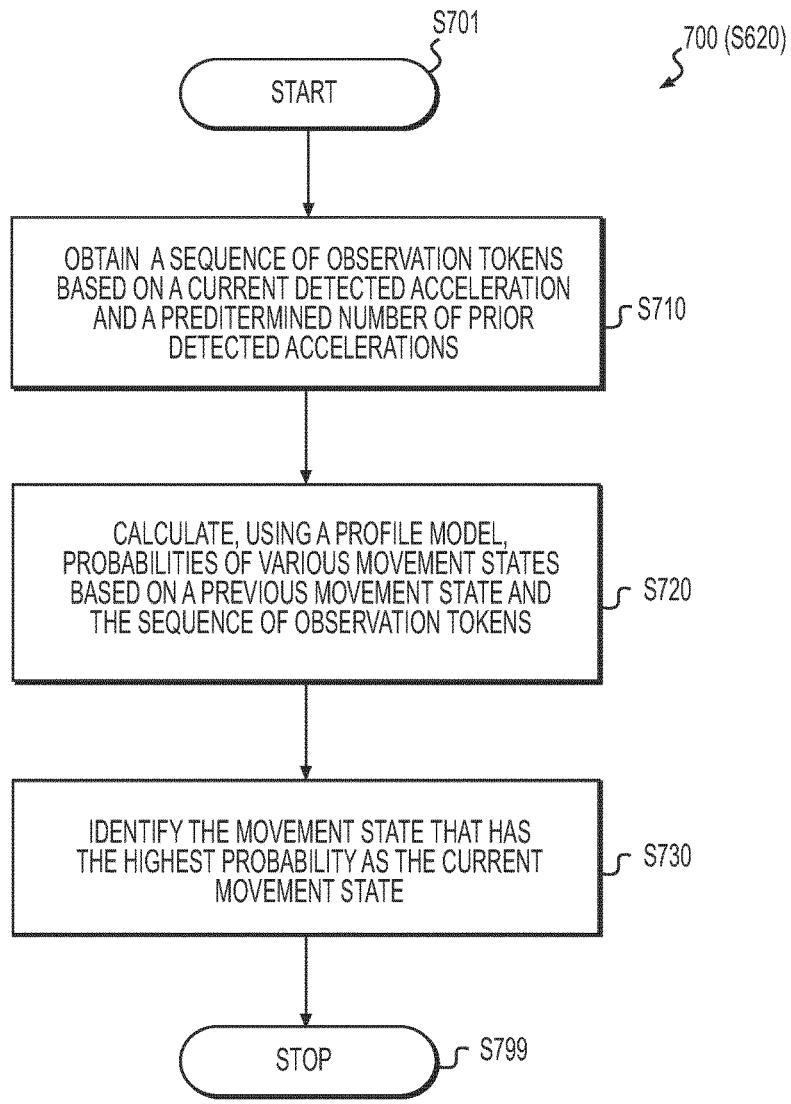
FIG. 7 shows a flow chart outlining an example process of determining an interim movement state by a profile-based movement state detector according to an embodiment of the disclosure.

FIG. 7 shows a flow chart outlining an example process 700 of determining an interim movement state by a profile-based movement state detector according to an embodiment of the disclosure. In some examples, the process 700 is performed by a profile-based movement state detector, such as the profile-based movement state detector 320 in FIG. 3. In some examples, the process 700 corresponds to S620 in FIG. 6. It is understood that additional operations may be performed before, during, and/or after the process 700 depicted in FIG. 6. The process 700 starts at S701 and proceeds to S710.

At S710, a sequence of observation tokens is obtained based on a detected acceleration and a predetermined number of prior detected accelerations. For example, a filter 330 converts a detected acceleration and a predetermined number of prior detected accelerations into a sequence of observation tokens {O} as illustrated with reference to FIG. 4A. In some examples, at S710 prior to converting the detected acceleration and the predetermined number of prior detected accelerations into the sequence of observation tokens, a low-pass filtering process is performed on a sequence of detected accelerations made of the detected acceleration and the predetermined number of prior detected accelerations.

At S720, probabilities of various candidate movement states being the interim movement state for this iteration are calculated based on the sequence of observation tokens and the previous interim movement state using a profile-based model. In some examples, the profile-based model is a Hidden Markov Model. For example, the likelihood calculator 344 calculates the probabilities $P_1(t_2)$, $P_2(t_2)$, $P_3(t_2)$, $P_1(t_3)$, $P_2(t_3)$, and $P_3(t_3)$ for candidate movement states $S_1$, $S_2$, and $S_3$ based on the transition and emission matrices 342a of the Hidden Markov Model and the previous interim movement state 342b as illustrated with reference to FIG. 4B.

At S730, a movement state among the candidate movement states that corresponds to a highest probability is identified as the interim movement state of this iteration. For example, the movement state selector 346 determines that the interim movement state is $S_3$ at time $t_2$ (i.e., $x(t_2)=S_3$) and that the interim movement state is $S_1$ at time $t_3$ (i.e., $x(t_3)=S_1$) as illustrated with reference to FIG. 4B.

After S730, the process proceeds to S799 and terminates.

In some examples, at least a portion of the features described in FIGS. 2-7 are implemented as one or more logic circuits dedicated to perform the corresponding functionalities. In some examples, at least a portion of the features described in FIGS. 2-7 are implemented in one or more computer programs that are performed by a system, such as the movement state detection system 800 illustrated with reference to FIG. 8.

Figure 8:
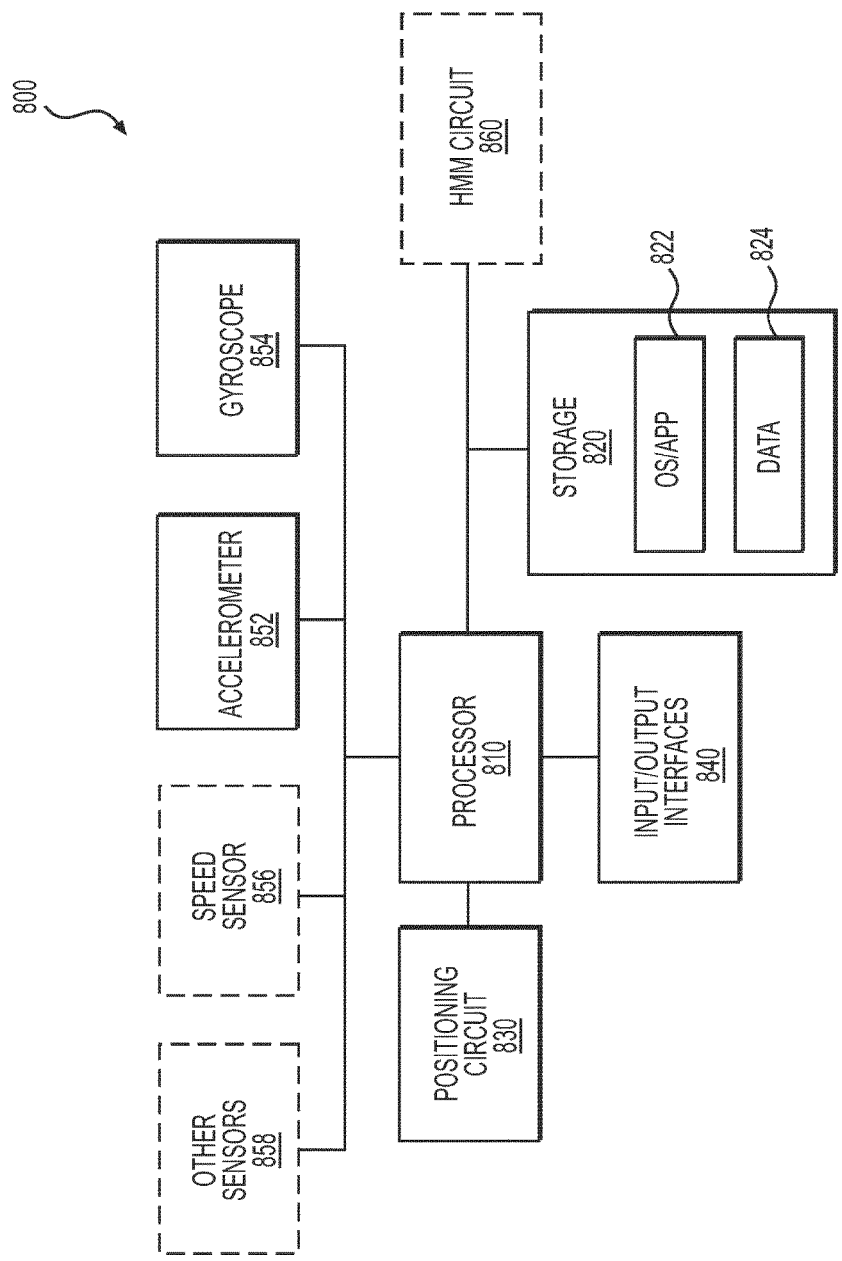
FIG. 8 shows a functional block diagram of an example movement state detection system according to an embodiment of the disclosure.

FIG. 8 shows a functional block diagram of an example movement state detection system 800 according to an embodiment of the disclosure. In some embodiments, the movement state detection system 800 is embedded in a mobile device, such as a tablet computer, a smart phone, a camera, a wearable device, or the like. In some embodiments, the movement state detection system 800 is installed on a vehicle, including a ground, maritime, or aerial, either manned or unmanned, vehicle, such as a bicycle, a motorcycle, a car, a train, a ship, an airplane, or the like.

The movement state detection system 800 includes a processor 810, a storage device 820 electrically coupled with the processor 810, a positioning circuit 830 electrically coupled with the processor 810, and input/output interfaces 840. The movement state detection system 800 includes an accelerometer 852 configured to provide detected accelerations and a gyroscope 854 configured to provide detected angular velocities, a speed sensor 856, and/or other sensors 858.

The movement state detection system 800 also includes a Hidden Markov Model (HMM) circuit 860. The HMM circuit 860 is a dedicated circuit that functions as the HMM analyzer 340 in FIG. 3 and/or performs the processes 600 and 700 in FIGS. 6 and 7.

The processor 810 includes a single processing core or multiple processing cores. The processor 810 is configured to execute an operating system and various application programs to perform various functions. In some examples, the processor 810 by executing instructions functions as one or more of the moving state detector 210, profile-based movement state detector 320, and refined movement state detector 230 in FIG. 2 and/or one or more of the filter 330, likelihood calculator 344, and movement state selector 346 in FIG. 3. In some examples, the processor 810 by executing instructions performs, in whole or in part, the process 500, 600 and/or 700 in FIGS. 5-7. In some examples, the processor 810 by executing instructions functions as the HMM circuit 860, and the HMM circuit 860 is thus omitted.

The storage device 820 is used to store an operating system and application programs (822), and/or other data or intermediate data for executing one or more of the application programs (824). In some examples, the application programs are compliance with one or more programming languages (e.g., Java, Objective-C, and the like), including compiled or interpreted languages, and are deployed as a stand-alone program or as a module, component, a browser-based web application, or other unit suitable for use in a computing environment. In some embodiments, storage device 820 includes a non-transitory computer readable medium, such as a semiconductor or solid-state memory, a random access memory (RAM), a read-only memory (ROM), a hard disk, an optical disk, or other suitable storage medium. In some embodiments, storage device 820 includes a plurality of non-transitory computer readable mediums listed above.

The positioning circuit 830 is configured to determine speeds and/or a position of the device 800. In some examples, the positioning circuit 830 includes a satellite-based positioning circuit that is configured to determine the speeds and/or position of the movement state detection system 800 based on satellite signals. In some examples, the positioning circuit 830 includes a ground-based positioning circuit that is configured to determine the speeds and position of the movement state detection system 800 based on wireless base station signals.

In some examples, the speed sensor 856 or other sensors 858 are configured to provide detected speeds to the processor 810. In some examples, the speed sensor 856 includes a wheel speed sensor, a fluid flow velocity sensor, or the like. In some examples, sensors 858 include a camera that, when working with the processor 810, functions as a graphic-based speed detector. In some examples, one or more of the speed sensor 856, and/or the other sensors 858 are omitted.

In some examples, the positioning circuit 830 or the speed sensor 856 and/or other sensors 858 function as the speed detector illustrated with reference to FIGS. 2-7.

The input/output interface 840 includes components through which a user interacts with the movement state detection system 800. In some examples, the input/output interface 840 includes one or more of a monitor, a keyboard, a touch panel, a speaker, a keyboard, a mouse, a toggle switch, a button, or the like.

In some examples, the accelerometer 852 functions as the acceleration detector illustrated with reference to FIGS. 2-7. In some examples, the accelerometer 852 is a single-axis accelerometer or a multi-axis accelerometer.

In some examples, the gyroscope 854 functions as the angular velocity detector illustrated with reference to FIGS. 2 and 5. In some examples, the gyroscope 854 is an inertia-based gyroscope or an optical-based gyroscope.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A system for detecting a movement state of a vehicle, the system installed in the vehicle or included in a mobile device carried in the vehicle, the system comprising:
a moving state detector circuit that is configured to determine whether the vehicle is moving based on a detected speed of the vehicle;
a profile-based movement state detector circuit that is configured to, determine an estimated movement state of the vehicle based on detected accelerations of the vehicle when the vehicle is moving, and determine whether the estimated movement state of the vehicle is a predetermined triggering movement state; and a refined movement state detector circuit that is configured to generate a refined movement state of the vehicle based on a detected angular velocity of the vehicle when the estimated movement state of the vehicle is the predetermined triggering movement state.

2. The system of claim 1, wherein the profile-based movement state detector circuit is configured to determine interim movement states of the vehicle based on the detected accelerations and to identify a latest one of the interim movement states as the estimated movement state of the vehicle when a second detected speed that is greater than a predetermined threshold is received.

3. The system of claim 2, wherein the profile-based movement state detector circuit is configured to:
convert the detected accelerations into a sequence of observation tokens;
calculate probabilities of candidate movement states based on the sequence of observation tokens; and
identify one of the candidate movement states that corresponds to a highest probability as the latest one of the interim movement states.

4. The system of claim 3, wherein the profile-based movement state detector circuit is further configured to perform a low-pass filtering process on the detected accelerations prior to converting the detected accelerations into the sequence of observation tokens.

5. The system of claim 3, wherein the candidate movement states include a moving straight state, a turning left state, and a turning right state.

6. The system of claim 1, further comprising a speed detector that outputs the detected speed, wherein the speed detector includes at least one of a satellite-based positioning circuit, a ground-based positioning circuit, a graphic-based speed detector, a wheel speed sensor, and a fluid flow velocity sensor.

7. The system of claim 1, further comprising an acceleration detector that outputs the detected accelerations, wherein the profile-based movement state detector circuit is further configured to:
determine a posture of the acceleration detector when a second detected speed that is equal to or less than a predetermined threshold is received;
determine a reference axis based on the detected posture of the acceleration detector; and
determine the estimated movement state based on components of the detected accelerations corresponding to the reference axis.

8. The system of claim 7, wherein the profile-based movement state detector circuit is further configured to calculate the components of the detected accelerations corresponding to the reference axis based on a conversion matrix.

9. A method for detecting a movement state of a vehicle, the vehicle equipped with processing circuitry or carrying a mobile device including the processing circuitry, the method comprising:
receiving, by the processing circuitry, detected accelerations of the vehicle at a first update rate;
determining, by the processing circuitry, interim movement states of the vehicle in response to receiving the detected accelerations of the vehicle;
receiving, by the processing circuitry, detected speeds of the vehicle at a second update rate that is slower than the first update rate;
identifying, by the processing circuitry, a latest one of the interim movement states of the vehicle as an estimated movement state of the vehicle when a first detected speed of the detected speeds of the vehicle that is greater than a predetermined threshold is received;
determining, by the processing circuitry, whether the estimated movement state of the vehicle corresponds to a predetermined triggering movement state; and
when the estimated movement state of the vehicle corresponds to the predetermined triggering movement state, determining, by the processing circuitry, a refined movement state of the vehicle based on a detected angular velocity.

10. The method of claim 9, wherein identifying the latest one of the interim movement states of the vehicle comprises:
converting the detected accelerations into a sequence of observation tokens;
calculating probabilities of various candidate movement states based on the sequence of observation tokens and a previous interim movement state using a Hidden Markov Model; and
identifying a movement state among the candidate movement states that corresponds to a highest probability as the latest one of the interim movement states.

11. The method of claim 10, further comprising:
prior to converting the detected accelerations into the sequence of observation tokens, performing a low-pass filtering process on the detected accelerations.

12. The method of claim 10, wherein the candidate movement states include a moving straight state, a turning left state, and a turning right state.

13. The method of claim 10, further comprising:
determining a posture of an acceleration detector when a second detected speed of the detected speeds that is equal to or less than the predetermined threshold is received;
determining a reference axis based on the detected posture of the acceleration detector; and
determining the interim movement states based on components of the detected accelerations corresponding to the reference axis.

14. The method of claim 13, further comprising calculating the components of the detected accelerations corresponding to the reference axis based on a conversion matrix.

15. A circuit for detecting a movement state of a vehicle, the vehicle equipped with the circuit, or carrying a mobile device including the circuit, the circuit comprising:
a moving state detector configured to:
set a moving state of the vehicle to a non-stationary state when a first detected speed of the vehicle greater than a predetermined threshold is received, and
set the moving state of the vehicle to a stationary state when the first detected speed of the vehicle that is equal to or less than the predetermined threshold is received;
a profile-based movement state detector configured to:
determine interim movement states of the vehicle when the moving state of the vehicle is at the non-stationary state by calculating probabilities of various candidate movement states based on a plurality of detected accelerations,
identify a latest one of the interim movement states as an estimated movement state of the vehicle when a second detected speed greater than the predetermined threshold is received, and determine whether the estimated movement state of the vehicle qualifies as a predetermined triggering movement state; and a refined movement state detector configured to:

determine a refined movement state of the vehicle based on a detected angular velocity when the estimated movement state qualifies as the predetermined triggering movement state.

16. The circuit of claim 15, wherein the profile-based movement state detector comprises:

a filter configured to convert the plurality of detected accelerations into a sequence of observation tokens; and a Hidden Markov Model analyzer configured to, during an iteration:

calculate the probabilities of the candidate movement states based on the sequence of observation tokens and a previous interim movement state from a previous iteration using a Hidden Markov Model, and identify a movement state among the candidate movement states that corresponds to a highest probability as an interim movement state of the iteration.

17. The circuit of claim 16, wherein the Hidden Markov analyzer comprises:

a storage configured to store transition and emission matrices of the Hidden Markov Model;

a likelihood calculator configured to calculate the probabilities of the candidate movement states using the transition and emission matrices of the Hidden Markov Model;

and a state selector configured to identify the movement state among the candidate movement states that corresponds to the highest probability.

18. The circuit of claim 16, wherein the filter is further configured to, prior to converting the detected accelerations into the sequence of observation tokens, perform a low-pass filtering process on the detected accelerations.

19. A system for detecting a movement state of a vehicle, the system installed in the vehicle or included in a mobile device carried in the vehicle, the system comprising:

a gyroscope configured to determine an angular velocity of the vehicle;

an accelerometer configured to determine an acceleration of the vehicle;

a moving state detector circuit that is configured to initially determine whether the vehicle is moving based on a detected speed of the vehicle;

a profile-based movement state detector circuit that is configured to, based on the moving state detector circuit initially determining that the vehicle is moving based on the detected speed of the vehicle, (i) determine, based in part on the acceleration of the vehicle as determined by the accelerometer and without using the angular velocity of the vehicle as determined by the gyroscope, an estimated movement state of the vehicle, and (ii) determine whether the estimated movement state of the vehicle corresponds to one of a number of predetermined movement states of the vehicle; and a refined movement state detector circuit that is configured to, responsive to the estimated movement state of the vehicle corresponding to one of the number of predetermined movement states of the vehicle, generate a refined movement state of the vehicle based on the angular velocity of the vehicle as determined by the gyroscope.

* * * * *